US012738128B2

(12) United States Patent
Corrente et al.

(10) Patent No.: US 12,738,128 B2
(45) Date of Patent: Sep. 15, 2026

(54) METHOD AND SYSTEM FOR ELECTRONIC INSTANT RAFFLES

(71) Applicant: Squarescore Inc., Burlington (CA)

(72) Inventors: Matthew Corrente, Burlington (CA); Mike Matich, Burlington (CA)

(73) Assignee: Squarescore Inc., Burlington (CA)

( * ) Notice: Subject to any disclaimer, the term of this patent is extended or adjusted under 35 U.S.C. 154(b) by 221 days.

(21) Appl. No.: 18/716,119

(22) PCT Filed: Dec. 5, 2022

(86) PCT No.: PCT/CA2022/051778
§ 371 (c)(1),
(2) Date: Jun. 3, 2024

(87) PCT Pub. No.: WO2023/097409
PCT Pub. Date: Jun. 8, 2023

(65) Prior Publication Data

US 2025/0069483 A1 Feb. 27, 2025

Related U.S. Application Data

(60) Provisional application No. 63/285,743, filed on Dec. 3, 2021.

(51) Int. Cl.
*G07F 17/32* (2006.01)

(52) U.S. Cl.
CPC ........ *G07F 17/329* (2013.01); *G07F 17/3225* (2013.01); *G07F 17/3267* (2013.01)

(58) Field of Classification Search
CPC ............... G07F 17/329; G07F 17/3225; G07F 17/3267; G07F 17/326
See application file for complete search history.

(56) References Cited

U.S. PATENT DOCUMENTS

| | | | | |
|---|---|---|---|---|
| 2002/0138594 | A1* | 9/2002 | Rowe | G07F 17/32 709/219 |
| 2003/0050853 | A1 | 3/2003 | Salls | |
| 2008/0058049 | A1* | 3/2008 | Lutnick | G07F 17/3293 463/16 |

(Continued)

OTHER PUBLICATIONS

CIPO as ISA, International Search Report and Written Opinion for PCT/CA2022/051778, Mar. 28, 2023.

*Primary Examiner* — Kevin Y Kim
(74) *Attorney, Agent, or Firm* — Own Innovation Inc.; James W. Hinton; John Bannister

(57) ABSTRACT

A system and method for conducting an instant electronic raffle. The system includes a first server, a server side module comprising a game database comprising games, wherein each game comprises a game size, bet size, and an amount of betting positions, equal to the value of the game size, and a game execution module, a client device, comprising a display device and an input device for receiving an input from a user, wherein the client device is configured to communicate with the server side module, wherein the server side module is configured to receive a bet from the client device input device, assign the bet to an open betting position within a game, wherein the game execution module is configured to be queried to execute the game, by drawing random numbers within a range of values.

20 Claims, 9 Drawing Sheets

(56) References Cited

U.S. PATENT DOCUMENTS

| | | | | |
|---|---|---|---|---|
| 2008/0102916 | A1 * | 5/2008 | Kovacs | G07F 17/3211 463/16 |
| 2009/0253516 | A1 | 10/2009 | Hartmann et al. | |
| 2009/0318231 | A1 | 12/2009 | Lange | |
| 2011/0003626 | A1 | 1/2011 | Meyer | |
| 2016/0012676 | A1 | 1/2016 | Howard | |

* cited by examiner 200-6

METHOD AND SYSTEM FOR ELECTRONIC INSTANT RAFFLES

TECHNICAL FIELD

The following relates generally to electronic raffle systems and methods, and more particularly to systems and methods for conducting an instant electronic raffle through a communication network.

INTRODUCTION

Participation in a raffle may provide excitement to an end user. Traditionally, raffles are conducted manually, with paper tickets. End users may purchase a raffle entry, wherein the raffle administrator will accept payment and provide the user a numbered entry raffle ticket. A corresponding draw raffle ticket, with an identical number may be placed into a draw pool. After a set period of time, or after all entry tickets have been sold, the raffle administrator may draw a draw raffle ticket from the pool. The user possessing the entry raffle ticket corresponding to the draw raffle ticket drawn from the pool is the winner of the raffle and may be awarded a prize. The prize may be a fraction of the sum of all ticket purchase payments. The remainder of this sum may be provided to the raffle administrator as a house cut, or administration fee.

Traditional paper ticket raffles have a number of limitations. They are administratively expensive. Due to the high fixed costs of administration, including the acquisition of reliable printed tickets, and human resource costs, there may be a relatively high minimum entry fee, and minimum participants required for a raffle to be profitable.

Additionally, traditional paper ticket raffles are limited to participants in the near vicinity of the raffle. A small number of participants limits the speed at which raffles may be conducted. Similarly, a small number of participants limits the number of raffles or sub raffles that may be conducted simultaneously. A high number of fast paced raffles with various entry prices and number of participants may provide an end user with a greater level of excitement.

Accordingly, there is a need for an improved system and method for conducting raffles that overcomes the disadvantages of existing systems and methods.

SUMMARY

According to an embodiment, described herein is an electronic instant raffle system and/or electronic game system.

The system includes a first server, comprising a processor and memory, a server side module, configured to run on the first server, the server side module comprising a game database comprising games, wherein each game comprises a game size, bet size, and an amount of betting positions, equal to the value of the game size, and a game execution module, a client device, comprising a display device and an input device for receiving an input from a user, wherein the client device is configured to communicate with the server side module and output a game interface to the display device, wherein the server side module is configured to receive a bet comprising a game size and bet size from the client device input device, query the game database to locate games with game sizes and bet sizes matching the game size and bet size of the bet, assign the bet to an open betting position within a located game, instruct the client device to update the game interface to indicate a bet confirmation to the user, wherein the game execution module is configured to be queried once all betting positions of a game are filled, and execute the game, wherein executing the game comprises drawing random numbers within a range of values, until the value associated with a first betting position is drawn, and assigning the first betting position to which the associated value has been drawn as the winning position.

According to an embodiment, described herein is an electronic instant raffle system, comprising a first server, comprising a processor and memory, a server side module, configured to run on the first server, the server side module comprising, a game database comprising all existing games, wherein each game comprises a game size, bet size, an age and an amount of betting positions, equal to the value of the game size, a game execution module, a client device, comprising a display device and an input device for receiving an input from a user, wherein the client device is configured to communicate with the server side module and output a game interface to the display device, wherein the server side module is configured to receive a bet comprising a game size and bet size from the client device input device, query the game database to locate all existing games with game sizes and bet sizes matching the game size and bet size of the bet, assign the bet to an open betting position within the located game with the largest age, instruct the client device to update the game interface to indicate a bet confirmation to the user, wherein the game execution module is configured to be queried once all betting positions of a game are filled, and execute the game, wherein executing the game comprises drawing a random number within the range of betting positions, and assigning the betting position corresponding to the random number as the winning position.

According to some embodiments, the server-side module further comprises a house betting module, wherein if the age of a game exceeds an age limit, the house betting module may place bets on all open betting positions of the game.

According to some embodiments, the age limit is predetermined.

According to some embodiments, the age limit is dynamically generated

According to some embodiments, each game further comprises a plurality of betting sub positions associated with each betting position and executing the game comprises drawing random numbers within a range of betting sub positions until all sub positions associated with a first betting position are drawn, and assigning the first betting position to which all sub position values have been drawn as the winning position.

According to some embodiments, executing the game further comprises drawing random numbers within the range of betting sub positions until a predetermined number of betting positions have had all sub positions drawn.

According to some embodiments, each betting position comprises five betting sub position slots, the first slot comprising a value range between 1 and 15, the second slot comprising a value range between 16 and 30, the third slot comprising a value range between 31 and 45, the fourth slot comprising a value range between 46 and 60, and the fifth slot comprising a value range between 61 and 75.

According to some embodiments, betting position comprises five betting sub position slots, the five sub position slots comprising value ranges associated with the value ranges of each letter range of a bingo game.

According to some embodiments, the system further comprises a game generation module, wherein when no existing games with game sizes and bet sizes matching the game size and bet size of the bet is located, the server side module is configured to input the game size and bet size of the bet to the game generation module, and the game generation module is configured to output a new game with a game size and bet size of the bet to the game database.

According to some embodiments, the server side module further comprises a bulk betting module, the bulk betting module configured to receive a bulk bet from the user, the bulk bet comprising a number of bets, a bet size and a game size, wherein the server side module is configured to receive a bulk bet from the client device input device, query the game database to locate all existing games with game sizes and bet sizes matching the game size and bet size of the bulk bet, query the game generation module to generate all required additional games, assign each bet to an open betting position within each located game, and instruct the client device to update the game interface to indicate a bulk bet confirmation to the user.

According to some embodiments, the bet size comprises a monetary value.

According to some embodiments, the server-side module further comprises a house betting module, wherein the house betting module is configured to place bets on any open betting positions of the game.

According to some embodiments, the house betting module is configured to place bets on all open betting positions.

According to an embodiment, described herein is a method of conducting an electronic instant raffle. The method includes receiving a bet input from a client device input comprising a bet size and game size, querying a game database to return active games and assigning the bet input to a game with a game size and bet size corresponding to the bet size and game size of the bet input.

According to some embodiments, each game comprises a plurality of betting positions, and the method further comprises executing each game when all betting positions are filled.

According to some embodiments, each game comprises a game age, and the method further comprises executing each game when the game age exceeds an age limit.

According to some embodiments, the age limit is predetermined.

According to some embodiments, the age limit is dynamically generated

According to some embodiments, the bet input is a bulk bet further comprising a number of bets, the method further comprising generating at least one game.

According to some embodiments, each game comprises a plurality of betting positions.

According to some embodiments, the method further includes executing the game.

According to some embodiments, each betting position comprises a plurality of betting sub positions, each associated with a sub position value, and wherein executing the game comprises drawing random values within a range of sub position values until all sub position values of at least one betting position of the game have been drawn.

According to some embodiments, executing the game comprises placing a house bet on all open betting positions of the game.

According to some embodiments, the bet input comprises a monetary value.

According to an embodiment, described herein is a bulk betting system for an electronic game, the bulk betting system including a bulk betting module, the bulk betting module configured to receive a bulk bet from a user, the bulk bet comprising a number of bets, and a bet size, wherein the bulk betting system is configured to receive a bulk bet from a client device input device, query a game database comprising a plurality of games, to locate all existing games with bet sizes matching the bet size of the bulk bet, query a game generation module to generate all required additional games, assign each bet to an open betting position within each located game, and instruct the client device to update a game interface to indicate a bulk bet confirmation to the user.

According to some embodiments, the bet size comprises a monetary value.

According to some embodiments, the bulk betting system further comprises a house betting module, wherein the house betting module is configured to place bets on all open betting positions of each located game with open betting positions.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
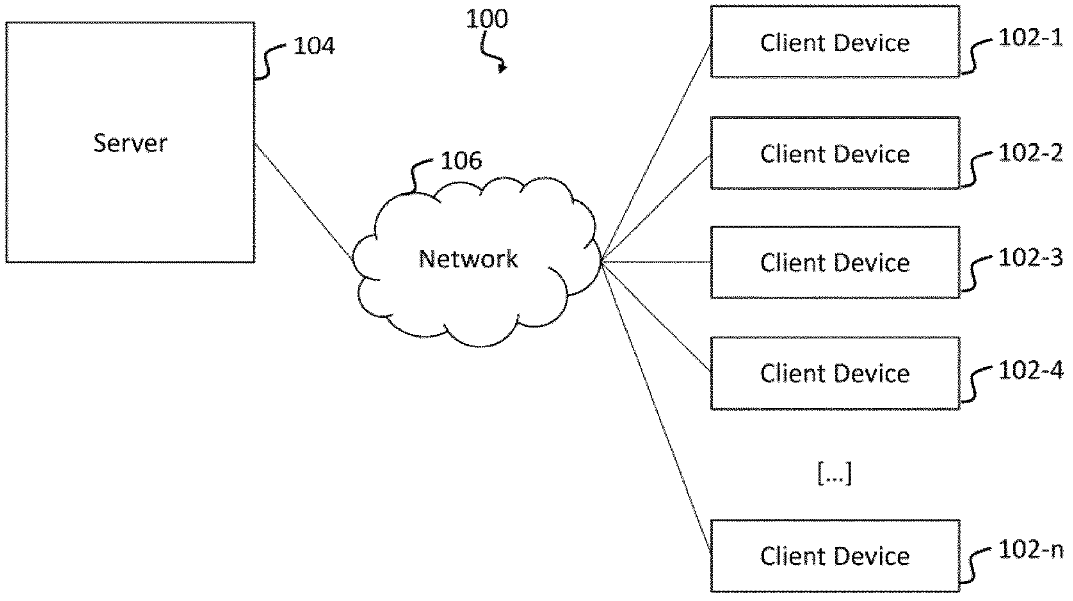
FIG. 1 is a block diagram of an electronic instant raffle system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to methods and systems for conducting electronic raffles, and more particularly to methods and systems for conducting instant electronic raffles through a communication network.

Communication networks, such as the internet, may allow individuals separated by a large geographic distance to interact electronically. Described herein is a system and method for conducting an instant online electronic raffle. A traditional raffle may take hours, days, weeks or longer to complete. The instant electronic raffle described herein may be executed in seconds.

The instant raffle described herein may be executed on a server device. A plurality of client devices may connect to the server device and interact with the server device. A raffle administration software program may be executed on the server device. A raffle client software program may be executed on each client device. The client software program and administration software program may interact, such that each user of each client device may participate in electronic instant raffles. Users may place bets of a desired amount (i.e. in real currency or credits) on raffle games of fixed size (i.e. betting slots or positions). When all betting slots or positions of a raffle have been bet on by end users, the raffle administration software program may execute the raffle game, randomly selecting a winner from among all participants. The winner is then identified, and awarded the prize corresponding to the raffle game in question.

Additionally, the instant raffle system described herein may provide for bulk betting. A user may programmatically bet on a plurality of raffle games with a single action, by inputting a desired number of bets, bet size, and game size. The raffle system may then programmatically place the user's bets across the desired raffle games, increasing the pace and flexibility of gameplay, increasing user engagement.

Figure 2:
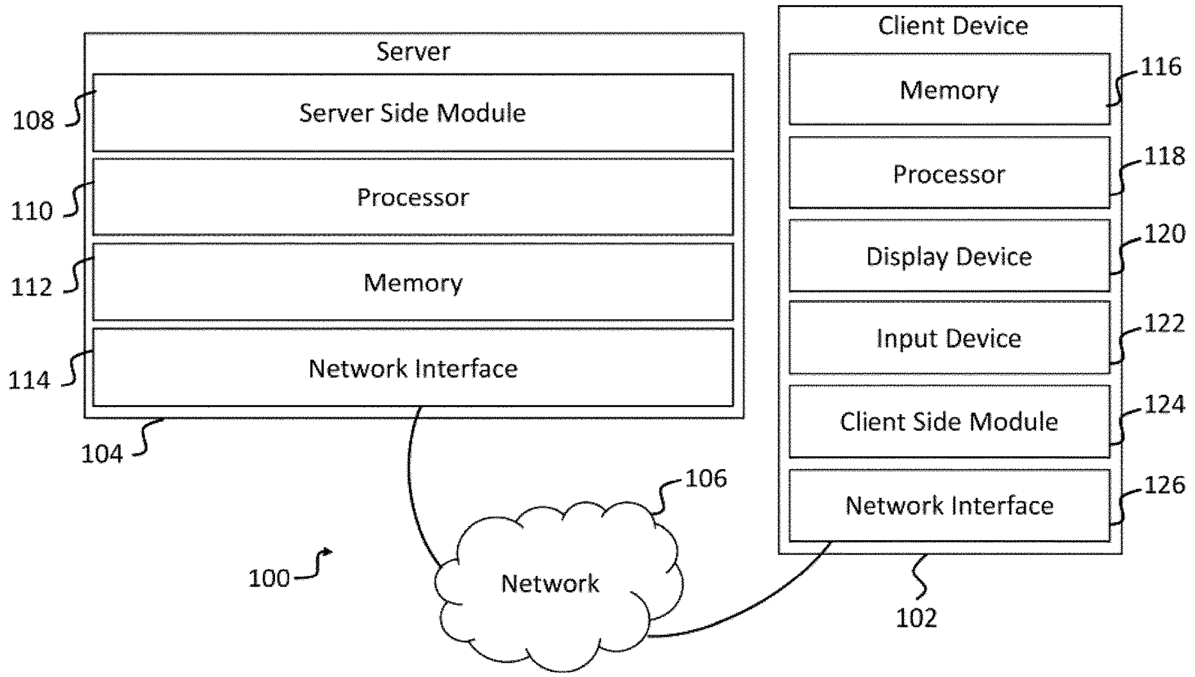
FIG. 2 is a block diagram of the electronic instant raffle system of FIG. 1.

Referring first to FIGS. 1 and 2, pictured therein is a block diagram detailing a system 100 for conducting an electronic instant raffle. The system comprises a server 104, and a plurality of client devices 102-1, 102-2, . . . , **102-*n***.

Client device 102 in the example of FIGS. 1 and 2 comprises a smartphone. In other examples, client device 102 may comprise a laptop computer, desktop computer, tablet computer, video gaming terminal, in-car entertainment device, or any other computing device. Client device 102 further comprises an input device 122, network interface 126, client side module 124, processor 118, memory 116 and a display device 120.

Input device 122 may be a keyboard, mouse, touchscreen, trackpad, trackball, or any other input device known in the art for enabling a user to provide an input to a computer system. The user may physically interact with client device 102 through input device 122 in order to pass input information into system 100.

Display device 120 may be an LCD display, OLED display, CRT display, LED display, or any other technology in the art that may convey information visually to an end user.

Client side module 124 may comprise a mobile app, desktop app, or some other software module installed or executed on client device 102. In some examples, such as when client device 102 interfaces with server 104 through a web browser, client side module 124 software may be served to client device 102 from server side module 108.

For example, client device 102 may be a Microsoft Windows™ based PC, interfacing with sever 104 through a web browser application, such as Google Chrome™, Mozilla Firefox™, Microsoft Edge™, or any other web browser application known in the art. When such a client device communicates with server 104, server 104 may serve the executable code comprising client side module 124 to client device 102, for execution by client device 102. In some examples, this executable code may comprise an HTML, CSS and/or JavaScript based web application.

Client side module 124 may comprise the software module enabling the end user to interact with system 100. Client module 124 may enable the client device 102 to generate user interfaces associated with system 100 on display device 120 and receive, process and pass inputs received from input device 122 to server 104 over network 106.

In some examples, multiple variants of client side module 124 may be available and served to different users as desired or requested, allowing for multiple variants of raffle games described herein to be served to various end users, while reusing some or all back end server side hardware and/or software components between raffle game variants.

Server 104 may comprise any server known in the art for executing and serving network accessible applications. Server 104 further comprises network interface 114, processor 110, memory 112 and server side module 108. In some examples, server 104 may comprise a server instance on a cloud hosting platform, such as Amazon Web Services™, Google Cloud™ or Microsoft Azure™, or another cloud based computing entity or instance.

Figure 3:
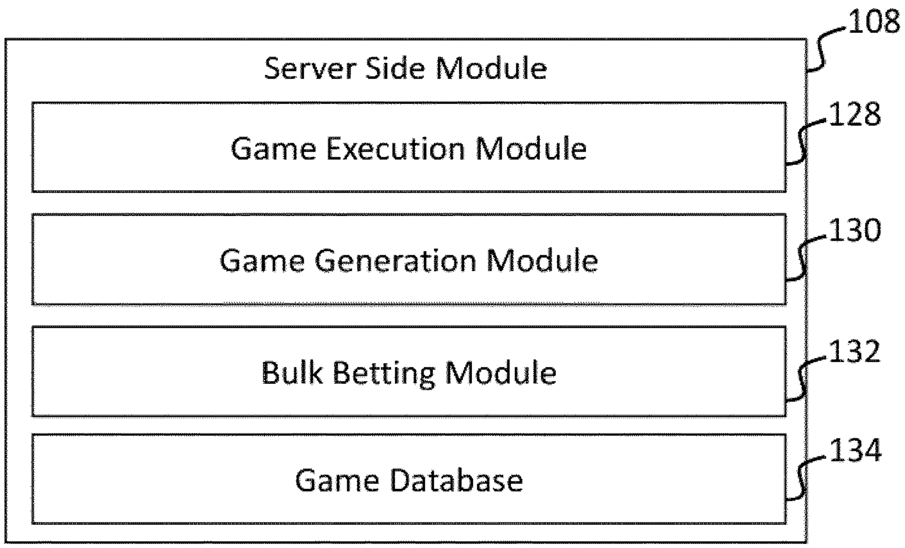
FIG. 3 is a block diagram of a server side module, for use with the electronic instant raffle system of FIGS. 1 and 2.

Referring now to FIG. 3, server side module 108 comprises a software module that is to be executed on server 104. Server side module 108 further comprises a game database 134, a game generation module 130, a bulk betting module 132, and a game execution module 128.

Figure 4:
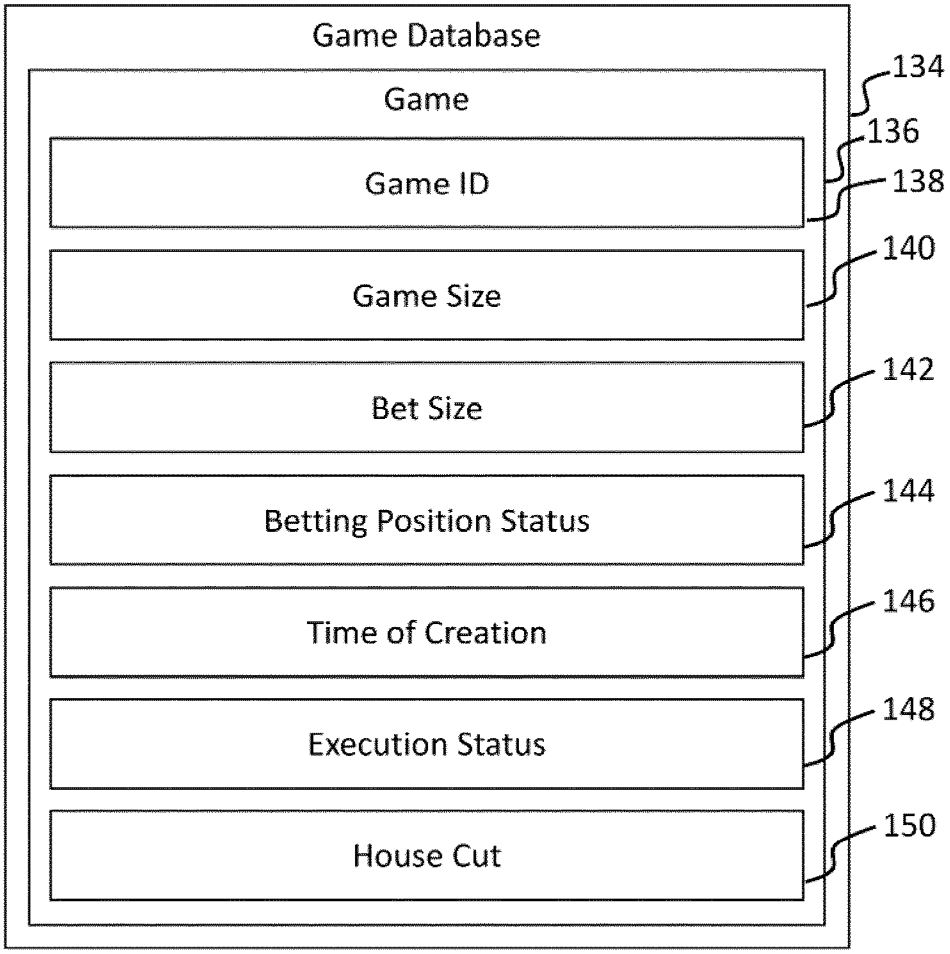
FIG. 4 is a block diagram of a game database, for use with the electronic instant raffle system of FIGS. 1 and 2.

Referring now to FIG. 4, Game database 134 comprises a machine readable database, storing game information. For each game, there may exist within game database 134 an entry corresponding to each game 136. Each game entry 136 may include a game ID 138, game size 140, bet size 142, status of all betting positions 144, time of creation 146, execution status 148, house cut 150 and other attributes. In some examples, game database 134 may keep records of all previously executed (expired) games 136.

Game database 134 may comprise a MySQL format database. In other examples, game database 134 may comprise other relational databases, non-relational databases and/or another format of database. While game database 134 is described as a single database, in some examples, game database 134 may comprise multiple databases.

Game ID 138 comprises a unique string, unique identifier or value that may be used to identify games, and as an address to locate and retrieve games. Game ID 138 may be unique for every game ever created by system 100. In some examples, Game IDs may be reused by system 100 once a certain number of games have been generated.

Game size 140 comprises the number of betting positions within the game 136 in question. For example, a given game may have a game size 140 of 25, wherein 25 individual bets equal to the bet size 142 of the game may be placed on the game. Game size 140 is equal to the total number of betting positions.

Bet size 142 comprises the amount of credit value required to place a bet on each betting position. In the example of system 100, bet size 142 is a fixed value for each game.

Betting position status 144 comprises the status of each betting position for a given game 136. Betting position status 144 may comprise data identifying the user that has placed a bet on each given position, such as a user ID or other identifier. Additionally, betting position status 144 may comprise the time at which bets have been placed on each betting position, as well as data identifying betting positions that have not yet been bet on. These betting positions may be referred to as open betting positions.

Figure 15:
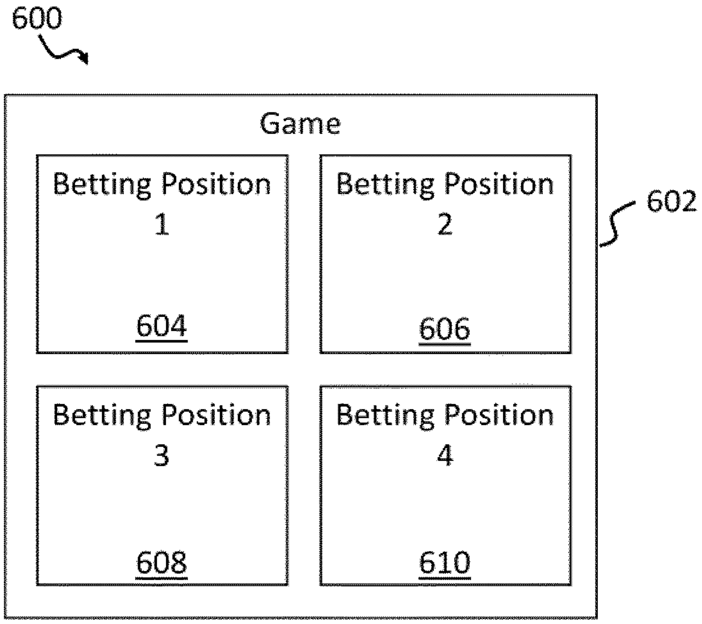
FIG. 15 is a block diagram depicting a raffle game comprising four betting positions, according to an embodiment.

Each betting position may be numbered or otherwise indexed according to an indexing system. For example, each betting position may be indexed by an integer, starting at 1, and sequentially incremented by 1 for each subsequent betting position. Referring now to FIG. 15, shown therein is a block diagram 600 of a game 602 comprising 4 betting positions, 604, 606, 608 and 610. A game with game size 4 may comprise 4 betting positions, numbered 1, 2, 3 and 4, as shown in FIG. 15.

In some examples, betting position status 144 may further comprise finishing order bet data. Finishing order bet data may be stored when a user bets on a betting position to finish in a certain position. For example, instead of betting on position 3 to finish first, a user may bet on position 3 to finish fifth. Alternatively, a user may bet on a position to finish within a range of positions (e.g. position 1 to finish top 3), combinations of such bets (positions 4, 6 and 7 to finish exactly at 1, 2 and 3), or any other possible combination of betting positions and finishing positions. In some examples, such a bet may be an individual bet (i.e. one of three position bets succeeding may result in a user payout), or a combined bet (i.e. wherein all three bets must be success for a user to receive a payout). In some examples, the payout or prize associated with each bet may be adjusted to correspond with the probability of success of such complex bets.

In some examples, each betting position may be associated with a number of sub positions. For example, a game may comprise game size 4, and each betting position may comprise a predetermined number of sub positions, such as five sub positions for each betting position. In such examples, each sub position may comprise an indexing integer value identifying the sub position slot, as well as a raffle value of each sub position.

For example, betting position 1 may comprise 5 sub positions, each comprising raffle values: 1, 2, 3, 4 and 5 respectively, and betting position 2 may comprise 5 sub positions, each comprising raffle values: 6, 7, 8, 9 and 10 respectively. In some examples, each sub position may comprise a sub position slot index value, which may be shared across all sub positions. For example, each sub position may comprise index values 1, 2, 3, 4, and 5. Unique sub positions may be identified using the combination of the betting position index value and the sub position slot index value, such as: betting position 1, sub position slot 2.

In some examples, each betting position may share some or all sub position raffle values. For example, betting position 1 may comprise 5 sub position slots, with values 1, 2, 3, 4, and 5, and betting position 2 may comprise 5 sub position slots with values 1, 2, 3, 6, and 7.

In some examples, each sub position slot may comprise a specific possible numerical range for raffle values across all betting positions. For example, in a configuration wherein each betting position comprises 5 sub position slots, sub position slot 1 may range from 1 to 10, slot 2 may range from 11 to 20, slot 3 may range from 21 to 30, slot 4 may range from 31 to 40, and slot 5 may range from 41 to 50. When betting positions are initialized, each sub position slot may be initialized for each betting position, according to these predetermined ranges. Each sub position may be initialized with a raffle value by drawing a random number within the permissible range of each sub position.

In some examples, each sub position slot may comprise a range aligned with ranges of known lottery games or games of chance such as bingo. For example, in a configuration wherein each betting position comprises 5 sub positions, the five sub position slots may align with the numerical ranges of 75 ball bingo, as commonly played in the United States. In such an example, sub position slot 1 may correspond to "B" and range from 1 to 15, slot 2 may correspond to "I" and range from 16 to 30, slot 3 may correspond to "N" and range from 31 to 45, slot 4 may correspond to "G" and range from 46 to 60, and slot 5 may correspond to "O" and range from 61 to 75.

Figure 16:
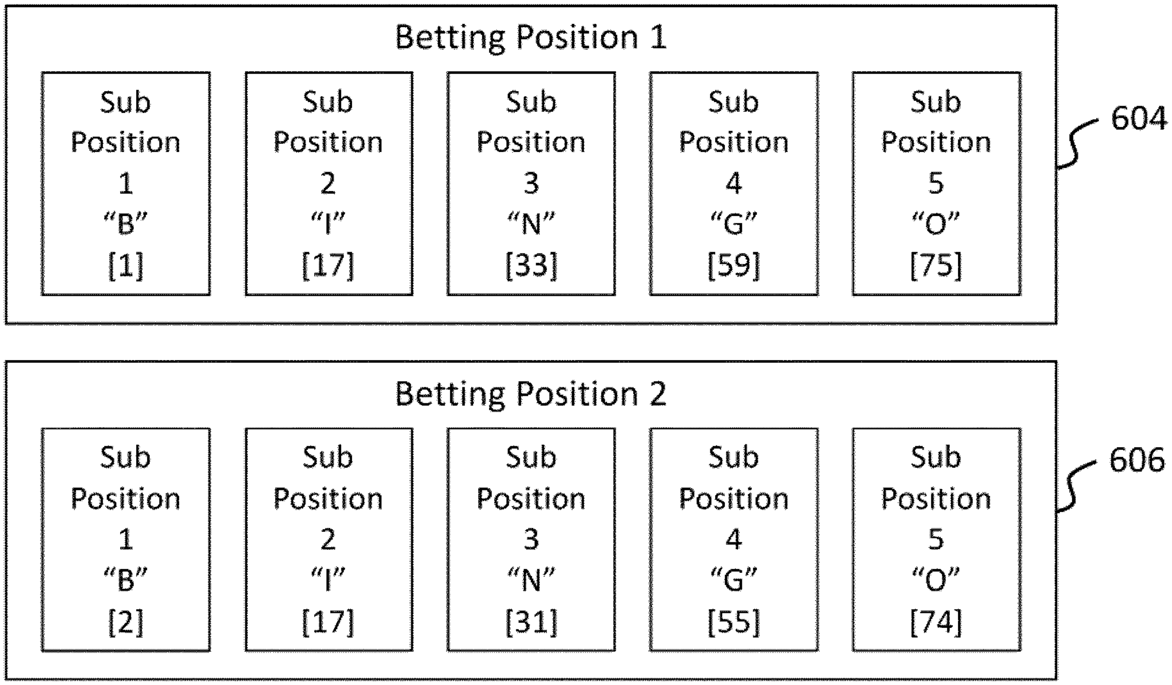
FIG. 16 is a block diagram depicting two betting positions each comprising 5 bingo format sub position slots, according to an embodiment.

Referring now to FIG. 16, shown therein is a block diagram of betting position 604 and betting position 606, each comprising 5 sub position slots. Each sub position slot is associated with bingo value ranges, as described above. Position 604 comprises sub positions 1 to 5 with values 1, 17, 33, 59 and 75 respectively. Position 606 comprises sub positions 1 to 5 with values 2, 17, 31, 55 and 74 respectively.

In some examples, sub positions may be present and allocated to each sub position in a manner opaque to the end user or raffle participant. For example, the end user may place a bet on a betting position, however, sub position values are not visible to the end user, and the user may have no indication of the presence or existence of sub positions for each betting position.

Referring again to FIG. 4, shown therein is time of creation 146 value. Time of creation 146 may comprise the time at which the game was generated, for example, by game generation module 130. In some examples, the time of creation 146 may be a date and time in UNIX time format.

Execution status 148 comprises data regarding whether a game has been executed. Within the context of this disclose, game execution state refers to whether a winner has been selected, and or notified and paid out. In some examples, execution status 148 may comprise only a single flag denoting whether a game has been executed or whether a game is still active and has not yet been executed. In other examples, execution status may comprise additional data, such as winning betting position, and time of execution. Games that have been executed may be referred to as expired games in some examples.

House cut 150 may comprise data as to what amount or percentage of the sum of all bets placed on a single game is to be paid to the raffle administrator after the execution of the raffle. House cut 150 may comprise a percentage value or credit value.

In some examples, game database 134 may store additional data associated with a progressive game of chance. For example, a progressive game may be associated with each user. This progressive game may comprise a number of values or positions, wherein the values are randomly generated for each user. In some examples, such a progressive game may be reset or regenerated periodically, i.e. every twenty four hours. The progressive game may be stored in game database 134 as a game, with additional metadata identifying the game as a progressive game, and associating the progressive game with a specific user.

In some examples, game database 134 may store additional metadata associated with each game, such as user visual settings, such that a system administrator may determine the visual experience of each user for every game on record in game database 134.

In some examples, game database 134 may archive long expired games in another storage location, to promote database efficiency.

In some examples, records of all games may be stored for record keeping, regulatory and/or compliance purposes. A sufficient amount and subset of data may be stored long term such that all games may be "replayed" or "reanalyzed" in full.

While in the example described herein, each game 136 comprises a fixed game size 140 and bet size 142, in other examples, a game 136 may be of variable or expandable size, and bet size 142 may be variable, such that raffle participants may each bet differing amounts for a single bet on a given game.

In other examples, other data structures instead of a database may be employed for the storage of active and expired games, and associated data described herein. In some examples, game database 134 may comprise a combination of a database or databases and other data structures.

Referring again to FIG. 3, game generation module 130 comprises a software module which may be called to generate new games when required. Game generation module 130 may be provided an input comprising a desired game size 140, and bet size 142. In some examples, additional attributes (e.g. house cut 150 or any other suitable attribute) may be provided. Game generation module 130 may output to game database 134, such that newly generated games are stored in game database 134.

Bulk betting module 132 comprises a software module which allows an end user to programmatically place bets across multiple games in a single transaction. A user may provide a desired number of games, bet size and game size to bulk betting module 132. In some examples, a user may provide additional inputs, such as number of bets desired per game.

Bulk betting module 132 may query game database 134 to locate active games in which desired user bets may be placed. If some or all desired bets cannot be placed on existing active games, bulk betting module 132 may call game generation module 130 to generate all needed additional games, passing associated attributes including game size 140 and bet size 142, to game generation module 130. Game generation module may output new games to game database 134. Once new games have been generated, bulk betting module 132 may place all bets (or all remaining bets that have not yet been places) on games present in game database 134.

The use of bulk betting module 132 provides advantages beyond convenience and excitement to an end user. Such computer implemented games are inherently limited by processing power and energy supply to the computer system operating the game. Placing bulk bets may be more computationally efficient than placing a plurality of individual bets. While the bulk of processing in system 100 may occur within server 104, certain processing capabilities are required of client device 102. Client device 102 will consume local processing resources while receiving physical bet inputs from an end user and passing bet inputs to server 104 over network 106. For a fixed number of bets, more processing operations may be required by client device 102 when placing bets through a bulk betting interface versus a series of individual bets.

This reduced processing requirement may reduce the power supply requirement of a client device 102. As described above, client device 102 may be a portable device such as a smartphone, tablet or laptop computer, powered by a rechargeable battery with a fixed capacity. Reduced power requirements for client device 102 may improve the functionality of client device 102 and therefore the system as a whole by extending the battery life of client device 102, enabling a user to interact with system 100 for longer periods of time while away from a fixed power source. Enabling a user to place more total bets with a given fixed energy supply to a portable client device 102 increases the amount of mobile playing time, which is an attribute of the computer system.

Game execution module 128 comprises a software module which may be called upon to execute games once all betting positions of a game have been filled, or after a certain period of time has elapsed (e.g. after the game age exceeds an age limit). Server side module 108 may continuously monitor the status of active games within game database 134. If server side module 108 locates a game which is full, server side module 108 may call game execution module 128, and pass the corresponding game ID 136 to the game execution module 124 for execution.

During game execution by game execution module 128, game execution module 128 may draw a random number within the range of number of betting positions for a given game. For example, a game with a game size of 4 comprises 4 betting positions, each numbered 1 to 4. Game execution module 128 may draw a random number between 1 and 4. The drawn random number corresponds to the winning betting position. The user who had placed the bet on this betting position is deemed the winner of the raffle game, and is subsequently awarded the sum of bets placed on the raffle, minus the house cut in some examples. A record of the game execution, winning position, and winning user may be stored in game database 134 in some examples.

In examples wherein sub position raffle values are generated for each betting position, game execution module 128 may draw a plurality of sub position values within the sub position value range of the game until all of the sub position values for a single betting position of a game are drawn, at which point, that betting position is deemed to have been drawn. For example, a game with a game size of 4 comprises 4 betting positions, each with five sub positions with raffle values ranging between 1 and 20. Betting position 1 may comprise five sub positions, numbered 1, 7, 12, 14, and 20. Game execution module 128 may draw a sub position value between 1 and 20, until all 5 sub positions of a betting position are drawn. For example, game execution module may proceed to draw the following 7 sub positions values in sequence: 1, 2, 3, 7, 12, 14, 20. Once the 7$^{th}$ value (i.e. 20) has been drawn, all sub position values associated with betting position 1 have been drawn (i.e. 1, 7, 12, 14 and 20) and accordingly, position 1 has been deemed to have been drawn.

In examples wherein sub position slots correspond to values such as those for known lottery games or games of chance such as bingo, the rules for such games may be used to assign betting positions as winning positions. For example, in one configuration, a linear bingo variant may be applied to each betting position, comprising five sub positions, each corresponding to "B", "I", "N", "G", and "O" respectively, and the typical numerical ranges of each letter. When all sub position values associated with a given betting positions are drawn, that betting position will be deemed to be a winner and/or to have been drawn. The first betting position to be drawn may be deemed to be the game winner.

In other examples, a full grid bingo variant may be applied to each betting position, each betting position comprising 24 sub position slots, and one "free space" slot, as present on a typical USA format bingo card. The first betting position to have sub position values drawn such that a bingo scoring combination is present across the sub positions (e.g. a horizontal, vertical or diagonal line, full card or other scoring combinations) may be deemed to be the winner of the game. In some examples, various scoring combinations may be tabulated, and used to rank and/or score betting positions. In other variations of a full grid bingo variant, 25 sub positions may be present, wherein one sub position (e.g. the central sub position) is automatically deemed to be drawn before game execution or at the time of game execution.

In such full grid bingo examples, sub positions may be rearranged in numerical order according to each lettered bingo column. Such a rearrangement may allow for scoring (e.g. line determination) according to typical bingo rules.

Figure 17:
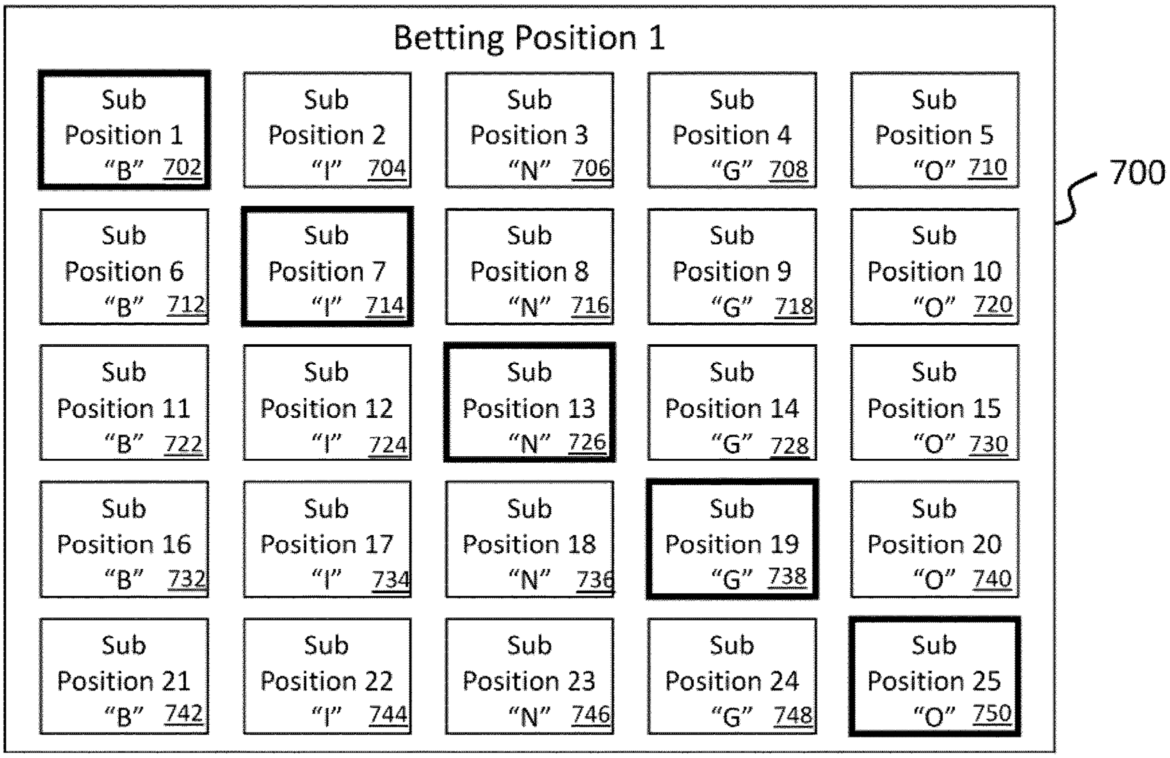
FIG. 17 is a block diagram depicting a betting position comprising 25 bingo format sub position slots, according to an embodiment.

Referring now to FIG. 17, shown therein is a betting position 700 comprising 25 sub positions arranged in a full bingo card pattern, according to an embodiment. In such an example, sub position 726 may comprise a free space. In the example of FIG. 17, a diagonal line is highlighted, showing an example scoring bingo combination. This diagonal line comprises sub positions 702, 714, 726, 738 and 750.

Applying game mechanics of other known lottery games or games of chance may advantageously allow the system described herein to provide end users with a gaming experience that mimics or incorporates elements of the dynamics, relative pacing, and/or scoring patterns of other known lottery games or games of chance, with faster or different absolute pacing or gameplay, which may increase end user engagement and excitement.

Such game mechanics may not be implemented without the system described herein. For example, it would be impossible to conduct the raffle using this sub position scoring system using a traditional paper raffle method, as tabulating results would require such an amount of time that the end user would not receive the instant feedback and engagement allowed for using this electronic raffle computer system and methods.

Figure 18:
FIG. 18 is a block diagram depicting a ranked finishing order for an executed raffle game, according to an embodiment.

Referring again to FIG. 3, some examples of game execution module 128 may be further configured to determine a ranked order of betting positions. For example, instead of drawing a single number corresponding to a betting position, or drawing sub position values until a single betting position is drawn, game execution module 128 may instead draw random numbers until all betting positions have been drawn. For example, see FIG. 18, wherein ten betting positions are displayed in order, from top to bottom, according to an embodiment. In the embodiment of FIG. 18, shown therein is a list of ranked betting positions 800. Betting positions are ranked in the following sequential order: 12, 19, 71, 52, 35, 22, 11, 1, 3 and 4.

In some examples, two or more betting positions may be drawn at the same time, as sub positions values are not necessarily unique combinations, depending on the embodiment. In such examples, game execution module 128 may assign the tied betting positions ranked positions randomly. In other examples, wherein two distinct users have bet on tied betting positions, one user may be deemed to have priority, and will have their betting position ranked higher than the betting position of the other user. In some examples, when one human user and the house betting module have placed bets on two betting positions which are tied after execution, the game execution module 128 may rank the human user's betting position as ranking higher than the betting position of the house betting module.

In an example, if a game comprises four betting positions, each numbered 1 to 4, game execution module 128 may draw a number between 1 and 4, and assign this first drawn number (e.g. 2) as the winner of the raffle game. Afterwards, the game execution module may proceed to draw further numbers, (e.g. any number from the following list: 1, 3, 4). The game execution module may assign the next drawn number as the second place position and save a record of the second place position in the game database. This process may continue until all positions are drawn, or until a subset of all positions (for example, the top ten finishing positions) are drawn.

In examples comprising sub positions for each betting position, sub position values may be drawn until all betting positions have been drawn, or a certain number of betting positions have been drawn.

Finishing order ranking records, such as shown in FIG. 18, may be stored in game database 134 in some examples.

Finishing position data may be used by the systems and methods described herein to apportion partial prizes to participants or users who finish below first place. For example, a game participant who finishes second place may receive 10% of the total prize associated with a game, while the first place game participant receives the remaining 90%.

In some examples, free plays may be awarded as game prizes. For example, instead of awarding a second place winner a proportion of a total cash prize, the participant may instead we awarded a free play token (or multiple free play tokens) for a certain game (e.g. 25 betting position raffle game).

In one example, the following prizes may be awarded in a game with 100 betting positions, based on finishing order:

Places 1, 2, and 3 may be awarded cash-based prizes, place 4 may be awarded a free play for a 16 betting position game, place 5 may be awarded a free play for a 25 betting position game, place 6 may be awarded a free play for a 36 betting position game, place 7 may be awarded a free play for a 49 betting position game, place 8 may be awarded a free play for a 64 betting position game, place 9 may be awarded a free play for a 81 betting position game and place 10 may be awarded a free play for a 100 betting position game.

In other examples, other combinations of prizes may be awarded to various finishing positions.

Finishing position data may be used by the systems and methods described herein to further allow a user to bet on the finishing order of betting positions. For example, a user may bet on a first betting position to finish second and a second betting position to finish first. Such combined bets may allow the end user to alter the risk profile of their bet, which may correspond to a greater prize or payout size. For example, an end user betting on positions 2, 6 and 14 to finish first, second and third respectively is placing three individual, combined bets. As the odds of these bets being correct is lower than an individual bet, the system may accordingly adjust the prize or payout of such a bet to correspond to the probability of a user winning such a bet. Such an adjusted prize or payout may have a house cut portion subtracted, to provide for game administrator revenue to cover operating expenses and/or profit.

Referring again to FIG. 3, in some examples, game execution module 128 may be further configured to execute progressive raffle games simultaneously as the single play raffle games otherwise described herein. Such progressive raffle games may be generated and stored in game database 134 as described above. When a raffle game is executed by game execution module 128, the winning betting positions of instant raffle games may be applied to progressive raffle positions for a user's progressive game. When all progressive betting positions are drawn for a user's game, the user may be deemed to have won their progressive game, and may be awarded a progressive prize.

Some examples of server side module 108 may further comprise a house betting module. The house betting module may be configured to place bets on open betting positions when called upon. The house betting module may be called upon by server side module 108 automatically once a game reaches a game age greater than a game age limit. Once called, and passed a game ID of interest, house betting module may place bets on all remaining betting positions. After the house betting module is called upon for a specific game, all betting positions of that game will then be filled. The game may then be executed by game execution module as previously described.

House betting module may speed up raffle gameplay. In some situations, not enough end users may be actively participating in raffle games in order to quickly fill all betting positions of all active games within a reasonable time frame. By placing house bets on open betting positions, games may be quickly filled, and executed, speeding up gameplay for users.

Game age limits may be predetermined. For example, if a game is more than one hour old, server side module 108 may call house betting module to fill all betting positions of the game and execute the game. In other examples, other age limits may be applied.

In other examples, game age limits may be dynamically generated. When the number of respondent devices 102 connected to server 104 is high, the age limit may be set to a higher threshold. In other examples, game age limits may be dynamically varied, in order to optimize another measurable parameter, such as active users, average bet size, average game size of bets, average bulk bet size, or other parameters.

Alternatively, in some examples, if a game age exceeds an age limit, all user bets may be refunded to each user, and the game in question may be deleted or archived.

Through the use of house betting module, system 100 may reduce the computing resources required. Computer based electronic games may be inherently limited in scale, due to memory constraints. Accepting bets from end users across many games may further increase memory use, and may inherently limit game size, and number of total users, as the maximum available memory may be fixed.

House betting module may clear relatively inactive games from active use, reducing processing and memory requirements, as expired games may be archived in long term storage, instead of rapidly accessible memory locations, improving performance of system 100 overall. House betting module may additionally reduce operation costs of system 100, especially in examples wherein server 104 comprises a cloud server instance, as described above.

In some examples, the games described herein may be applied to single human user examples, wherein only a single user is playing, and all other positions are drawn by house betting module. In such examples, the user may place all of their desired bets across desired betting positions and/or games, and remaining betting positions may be bet on using house betting module. In such examples, house betting module may be automatically called when the user confirms their bets, or after a certain time has elapsed.

In some examples, house betting module may allow the systems and methods described herein to simulate a live raffle with many participants, with only one end user. The end user may place bets across desired games and betting positions, and house betting module may place bets in a pattern which may appear to be bets of other human live participants. This may increase the excitement and engagement for the end user, versus an example wherein a user is transparently playing against an automated house player, or wherein the house betting module places bets in an unnatural, robotics and/or unusually fast manner.

In some examples, house betting module may vary the pattern of placed house bets according to historical and/or measured parameters which may accord to user engagement. For example, the house betting module may place bets according to a pattern which optimizes user engagement, such as number of future bets, or future bet totals. House betting module may continuously vary betting patterns to measure user responses, or may conduct other forms of user testing (e.g. A/B testing or similar methods) to optimize house betting patterns.

In some examples, house betting module may apply machine methods, algorithms and/or techniques to optimize betting patterns. For example, historical house betting pattern data and user engagement data (such as future bet amounts, bet amounts over the next fixed period of time, user session length, sum of user session lengths over a set period of time or other similar data or parameters) may be used to train a supervised machine learning model, for example, a regression or optimization type machine learning model. Such a trained machine learning model may be used to subsequently generate more optimal house betting patterns.

The use of house betting module may also advantageously allow the administrator of the raffle system to increase their profit margins or reduce the "house cut" taken from each raffle game winner. As there is no cost to the raffle administrator to place a house bet, a larger proportion of house bets to user bets may increase the theoretical or actual profit of the raffle administrator.

In some examples, the systems and methods described herein may be further configured to provide an end user with periodic promotions. For example, periodically, end users may be presented with offers comprising reduced cost bet opportunities, "free play" bet opportunities, bet multiplier opportunities, or other similar promotions which are advantageous to an end user. Such promotions may be presented to an end user at random, at predetermined times, at a frequency according with a user based quota and/or global quota. In other examples, such promotions may be presented to a user according to the previous play and/or betting history of the user. For example, users who bet larger amounts on average may be presented with promotions associated with a greater credit value or monetary value, or may be presented promotions more frequently. In some examples, promotions may be presented to users according to an optimization algorithm, which is configured to optimize user engagement variables, such as user session length, sum of session lengths over a given time period, average user bet, house profit attributable to a user, or other similar variables.

In some examples, promotions may be presented to a user based on the output of a trained machine learning method, algorithm and/or model. For example, historical user data may be used to train a supervised machine learning model to optimize promotion presentation for each user, according to the user's system use history. Such a trained machine learning model may be used to subsequently generate more optimal user promotion presentation patterns, including promotion presentation time, frequency and equivalent monetary value.

In some examples, promotions may be generated by a promotion module of server side module 108, and stored in game database 134.

Figure 5:
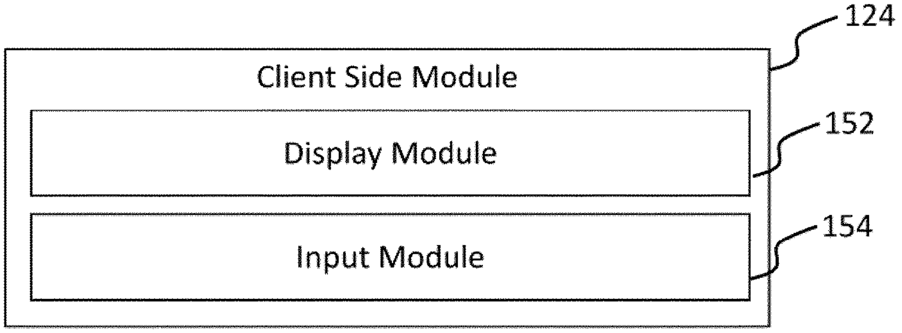
FIG. 5 is a block diagram of a client side module, for use with the electronic instant raffle system of FIGS. 1 and 2.

Referring now to FIG. 5, pictured therein is a block diagram of client side module 124. Client side module 124 may further comprise display module 152 and input module 154.

Display module 152 may communicate with display device 120 to output graphical user interface elements to display device 120 such that these elements may be viewed by an end user. Graphical user interface elements may be received by display module 152 from server side module 108 through network 106.

Input module 154 may communicate with input device 122. Input module 154 may receive input data from input device 122, and may pass input data to server side module 108 through network 106.

The software modules described above, such as server side module 108 and client side module 124, and submodules thereof, such as game database 134 may each comprise additional components not described herein. Additionally, modules and submodules may comprise differing structures, for example, in some embodiments, bulk betting module 132 and game generation module 130 may comprise a single unified module, or aspects of betting module 132 and game generation module 130 may be split across three separate software modules in some examples.

An end user may operate client device 102, such that client device 102 engages with server 104. Server 104 and client device 102 are configured to communicate with one another over a communication network 106 through network interface 114 and network interface 126. In the example of FIG. 1, server 104 and client device 102 communicate information to and from one another through network 106. Server 104 and client device 102 may communicate through the internet, a LAN, Bluetooth network, RF network, or any other network type known in the art.

In some examples, communications over network 106 may be encrypted by any encryption method known in the art. Encryption may prevent interception of communications over network 106 by unauthorized parties.

The end user may direct client device 102 to connect to server 104 through the internet, using input device 122 and display device 120. Server side module 108 may provide graphical user interface data to client device 102, for output to display device 120.

In some examples, the user may proceed with a login process (not pictured) before engaging with the elements of interface 200 describe below. The user may first provide their username and password to system 100 through an initial registration process. After registration, a user may continue to login to the system 100.

A user may provide a username and password to system 100 through input device 122. The client device 102 may pass this input data to server 104 through network 106. Once the user login data is received by server 102, server-side module 108 may check security session variables to ensure that they are in existence, and that that comprise data matching the information of the user in question. After the check is complete, the server side module 108 may call web services to retrieve user and game information for display on display device 120.

In some examples, login process may comprise receiving a username (e.g. login ID) and password, generating a JavaScript Object Notation (JSON) string or object comprising the username, calling the web service for authorization, receiving a response from the web service comprising all usernames, and corresponding encrypted passwords. The server side module 108 may encrypt the inputted password, and compare the encrypted password to the encrypted password corresponding to the provided username, provided by the web service. If the two encrypted passwords match, the session may be authenticated, and the security session variables may be set for the session.

Figure 6:
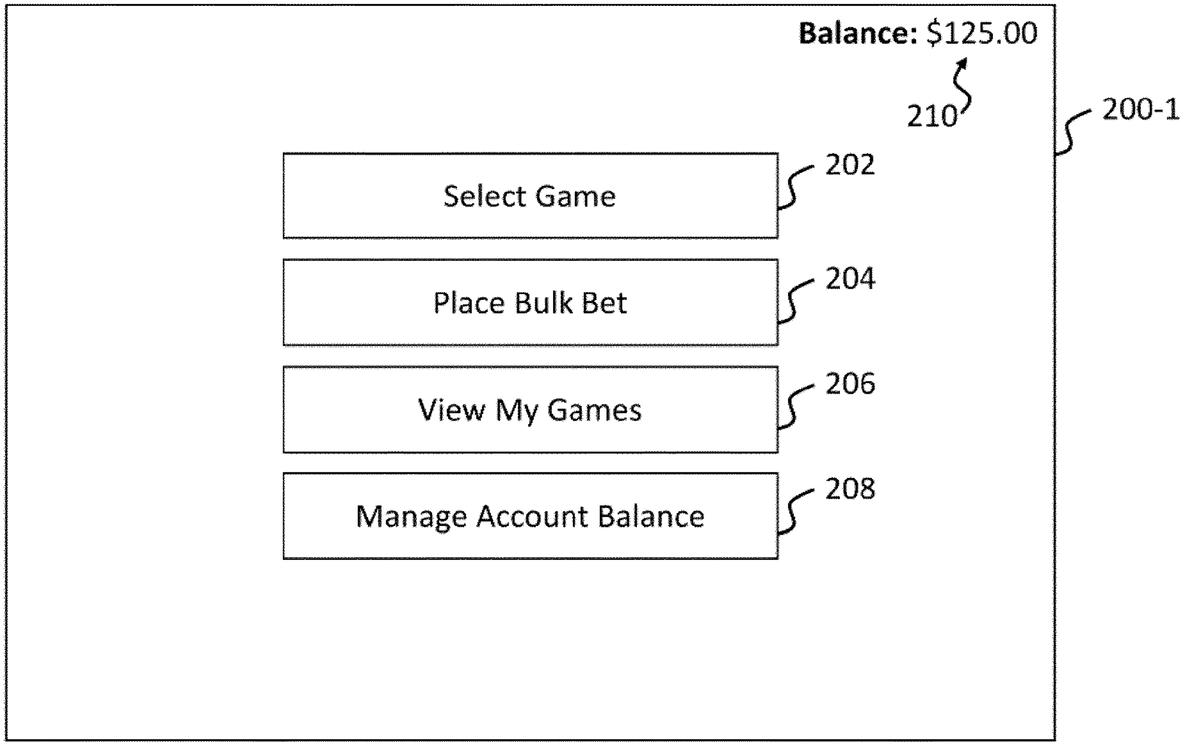
FIG. 6 is a graphical user interface, for display on the client device of the system of FIGS. 1 and 2, according to an embodiment.

In some examples, the server-side module 108 may periodically check the security session variables. If security session variables pass this check (in examples comprising such security features), and the client device 102 is engaged with server side module 108, the user may be presented with a graphical user interface 200-1, as pictured in FIG. 6. The graphical user interface may indicate to a user an account balance 210. In some examples, such as the example of FIG. 6, account balance may be a currency value. In other examples, the account balance may comprise a credit value. All account balance values may correspond to a value of physical cash, which may be increased or decreased through end user participation with system 100.

The user may select a number of options presented by the graphical user interface 200-1. As pictured in FIG. 6, the user may be presented with a plurality of user interface elements, including manage account balance 208 (by withdrawing or depositing funds or credits), view my games 206, select game 202, or place bulk bet 204. In other examples, the layout and user experience of the graphical user interface may differ, but similar functionality will be provided.

To participate in a raffle, the end user may select game element 202 and may input a bet by physically interacting with input device 122. When an end user physically selects select game element 202, the user may be transitioned to another graphical user interface screen, such as graphical user interface 200-2 of FIG. 7.

Figure 7:
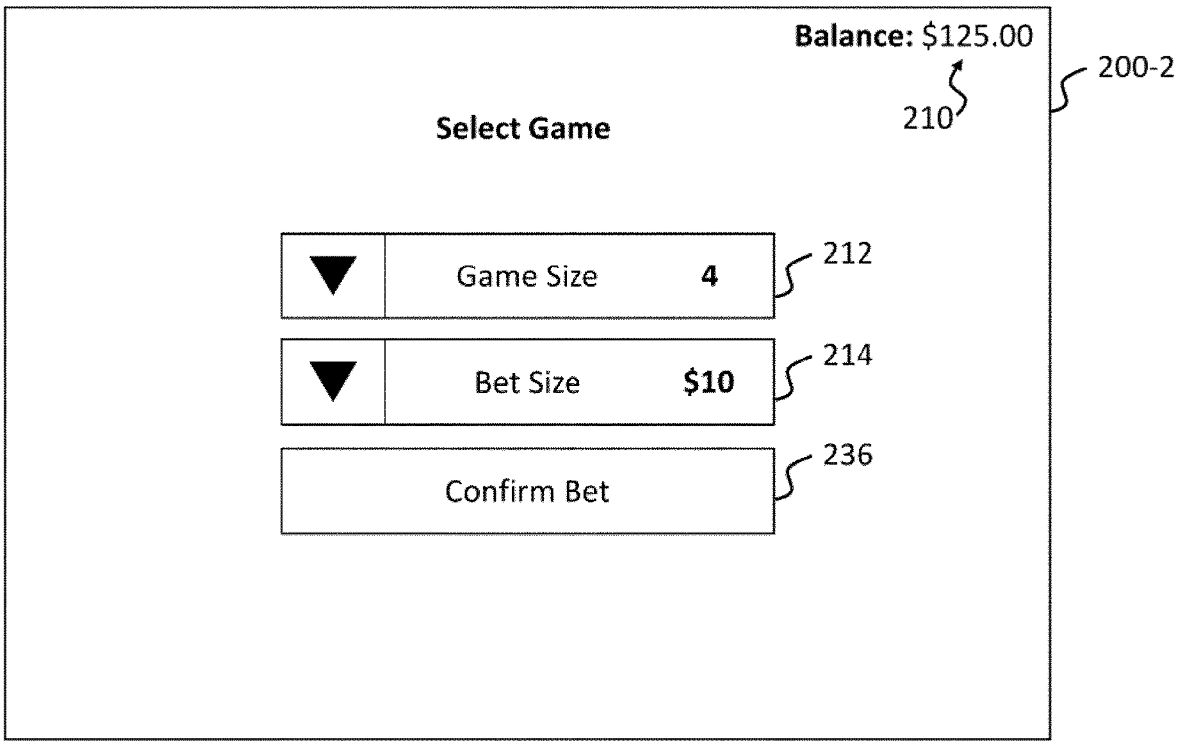
FIG. 7 is a graphical user interface, for display on the client device of the system of FIGS. 1 and 2, according to an embodiment.

As pictured in the example interface 200-2 of FIG. 7, a bet may comprise a game size and a bet size. A game size comprises the total number of betting positions available within a single game. A bet size comprises the credit amount required from a user for placing a bet on a game. A user may specify their desired game size by interacting with game size element 212 and their desired bet size by interacting with bet size element 214.

Figure 8:
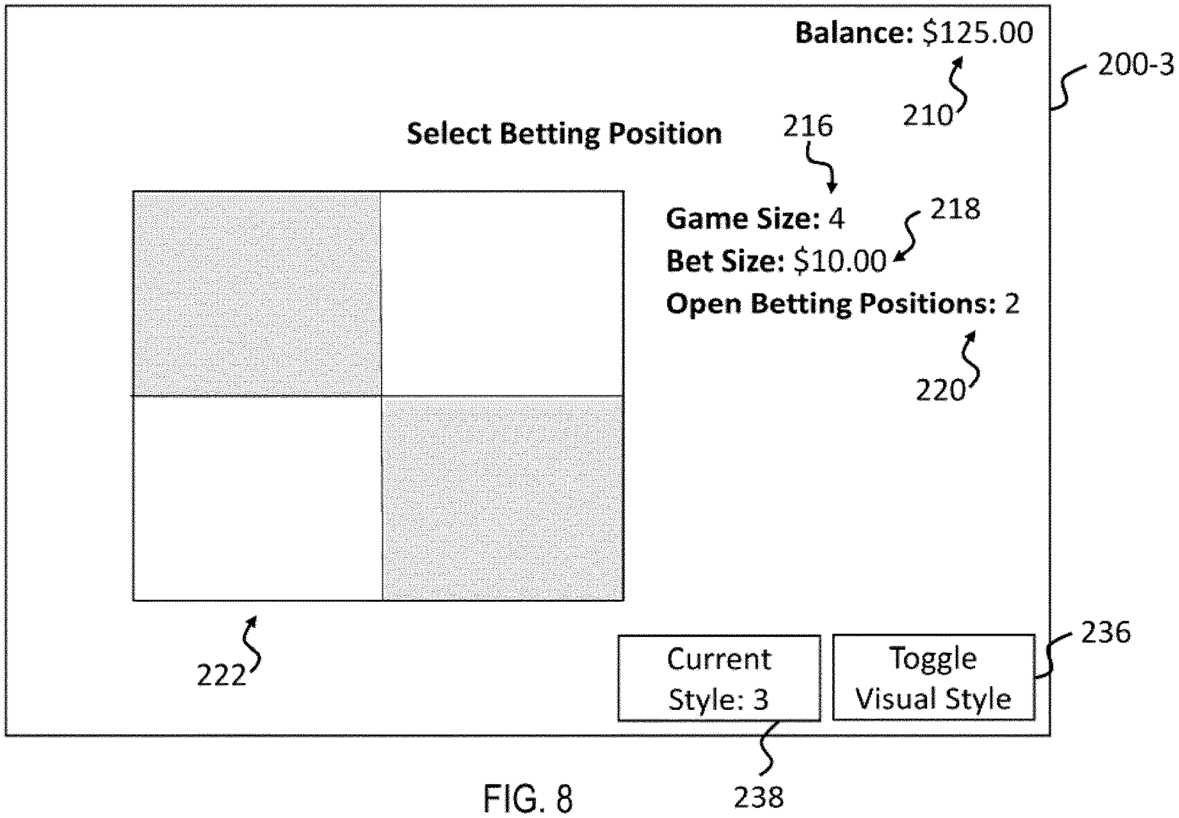
FIG. 8 is a graphical user interface, for display on the client device of the system of FIGS. 1 and 2, according to an embodiment.

Once bet attributes are selected by interacting with the elements described above, the user may select the confirm bet element 236. After selecting the confirm bet element 236, the user may be transitioned to an open/active raffle game interface 200-3 as pictured in FIG. 8. In the example of FIG. 8, the game is presented as a square grid 222, wherein each portion of the grid represents a possible betting position. A game with size 4 may be presented as a 2 by 2 square grid 222 of betting positions, as pictured in the example of FIG. 8. Occupied betting positions are indicated visually to the end user. In the example of FIG. 8, each occupied position may be shaded to indicate that the betting position is occupied. Additionally, game size display element 216, bet size display element 218 and open betting position element 220 may be present within interface 200-3 to indicate current game size, bet size and open betting position to an end user. Further, interface 200-3 comprises current style display 238 and visual style toggle 236.

In examples wherein a grid type interface is used to present active games to users, game sizes may generally comprise perfect square values. For example, game size options may comprise 4, 16, 25, and 100, or other such options.

The user may select an unoccupied betting position to place their bet onto. Once a betting position is selected and confirmed, the user may be presented with a confirmation that their bet has been successfully placed. In the example of FIG. 8, the entered bet size and game size comprises $10 and 4 respectively.

The system 100 may take a consistent house cut percentage from each micro-raffle. For example, a game with a game size of 4, and a bet size of $10 will collect a total bet amount of $40. The system may take a 10% house cut from each game, such that the winner of the micro-raffle receives $36 credits, and the house receives $4 credits. In other examples, a different house cut percentage may be used, or a flat rate house cut may be taken.

In other examples, system 100 may take a variable house cut out of each prize pool. The variable house cut may vary based on a number of factors. For example, system 100 may vary the house cut depending on the time of day, the status or rank of the users participating in a game, the season, the size of the game, the size of the bet or other factors. In such examples, the house cut currently applied may be displayed on the graphical user interface presented to a user through the display device 120.

Current style display 238 and visual style toggle 236 show the current visual style and provide an input to allow the user to change the visual appearance respectively, of interface 200-3 and/or other interfaces. By allowing a user to alter the visual style of the game interface, user engagement and excitement may be increased. While current style display 238 and visual style toggle 236 are shown associated with interface 200-3, current style display 238 and visual style toggle 236 may be present at any portion of the user interface displayed on client display device 120. Visual styles may comprise the color, shapes, animations, videos, layout and any other style elements associated with the electronic game systems and methods described herein. Styles may be associated with a set of sound effects and/or music, such that changing the style may also change the sound effect and/or music configuration. Current visual style may be stored by system 100 (e.g. in game database 134) such that the style the user was presented at any point of game play is known and may be reviewed.

In some examples, the user interface displayed on display device 120 may apply finishing position data to provide visual feedback to an end user denoting the finishing order of a game. For example, wherein square elements are used to denote betting positions, once the game has been executed, the square elements associated with each betting position may be animated in a manner according with finishing order. In an example, square elements associated with each betting position may be animated such as to disappear in reverse finishing order (e.g. last place betting position square disappears first, followed by the second last place square, and so on, until on the winning square remains) over a period of time, to indicate the result of the game, providing increased suspense and excitement to the end user. In other examples, betting positions may be visually indicated with elements of any other format, for example, roulette positions, depictions of racehorses, or any other visual element. In other examples, visual elements associated with each betting position may be animated, altered, or otherwise adjusted in any way according to betting position finishing order to visually indicate finishing positions to a user. In some examples, such visual indication of finishing order may be the first or only indication of finishing order to an end user, providing a natural user experience, to promote user engagement.

Figure 9:
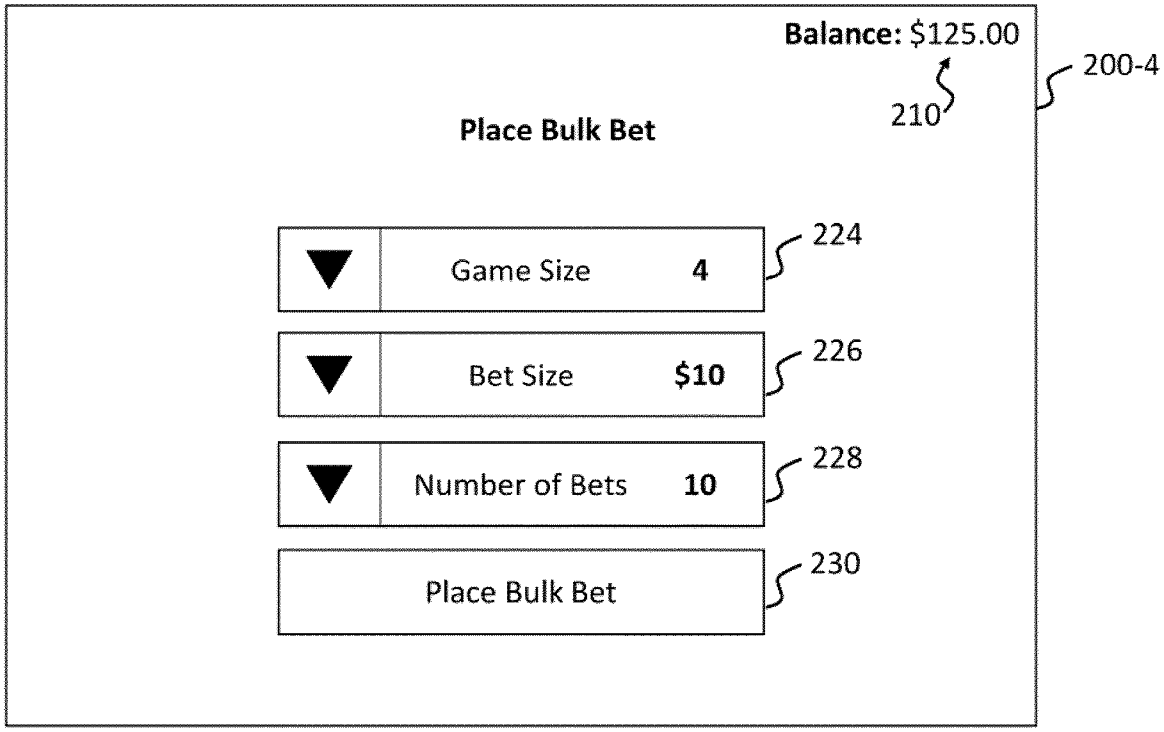
FIG. 9 is a graphical user interface, for display on the client device of the system of FIGS. 1 and 2, according to an embodiment.

Referring now to FIG. 9, pictured therein is a graphical user interface 200-4 for bulk betting, for display on display device 120, according to an embodiment. The interface comprises an input element for game size 224, bet size 226, and number of bets 228.

In some examples of system 100, bulk betting interfaces may further comprise additional inputs, such as number of games and number of bets desired per game. For example, a user may place a bulk bet with a bet size of 5, game size of 100, game number of 10 and bets per game of 2, for a total of 20 bets of size 5 across 10 games. This may provide an end user with flexibility to individualize betting strategy, personalizing gameplay, shifting betting odds and increasing excitement.

A user, through physical interaction with input device 122, may vary input elements according to their individual desires. A user may place the bulk bet by interacting with the place bulk bet element 230. Server side module 108 may receive these inputs, and pass them to bulk betting module, to place the bulk bet. After the bulk bet is processed, the user may be provided a bulk bet confirmation indication (not pictured).

Once the bulk bet has been placed, games in which the user has placed bets will execute once all betting positions have been filled. In some examples of system 100, games may also execute once a game reaches a certain age, as described above. Bulk bet games may execute at different times. A user may be notified of results of a bulk bet progressively over a set period of time. In some examples, a user may be notified after the execution of every game they participated in. In other examples, a user may only be notified when they are the deemed winner of an executed game, or may not be notified at all. In such examples, users may only view the results of each game by reviewing previous games manually, or reviewing account balance amounts.

Figure 10:
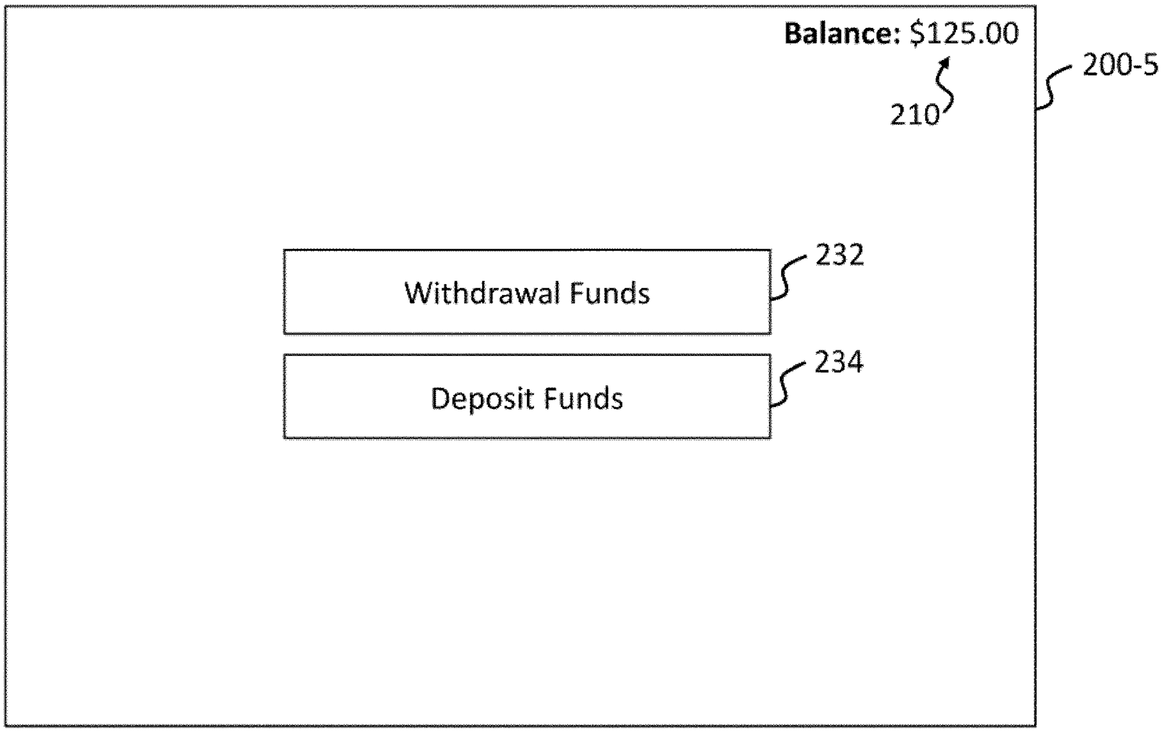
FIG. 10 is a graphical user interface, for display on the client device of the system of FIGS. 1 and 2, according to an embodiment.

Referring now to FIG. 10, pictured therein is an example account management user interface 200-5. Using the user interface 200-5 as pictured, the user may deposit or withdrawal credit, by interacting with graphical user interface elements 234 and 232 respectively. As described above, funds may comprise proprietary credits, third party points or rewards, or monetary currency. Interface 200-5 and interface elements 232 and 234 may be configured to interface with third party payment systems and platforms, to enable end users to deposit or withdrawal funds directly from or to bank accounts, credit cards, or other funding sources and platforms.

Figure 11:
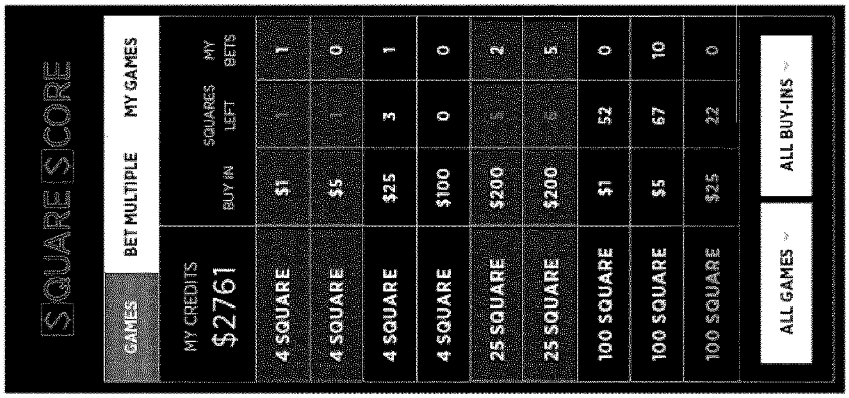
FIG. 11 is a graphical user interface, for display on the client device of the system of FIGS. 1 and 2, according to an embodiment.

Referring now to FIG. 11, pictured therein is an example mobile device graphical user interface 200-6 for display on display device 120 of system 100. Interface 200-6 comprises a number of elements and features common to interfaces 200-1 to 200-5. The "Bet Multiple" interface option enables a user to place a bulk bet. The "My Games" interface option enables a user to view games which the user has placed bets on. In some examples, the "My Games" interface option may enable the display of both expired previously bet upon games, as well as active bet upon games. All active games may be described and displayed in the main interface page of interface 200-6, as seen in FIG. 11.

In any steps described above in reference to system 100 and interface 200, system 100 may periodically verify security session variables. For example, system 100 may verify security session variables before accepting an individual bet input from a user, or accepting a bulk bet input from a user.

In any steps described above in reference to system 100 and interface 200 contemplating end user interaction with system 100 and interface 200, the end user interacts with the system 100 or interface 200 by physically manipulating input device 122. For example, and bet input comprises a physical interaction of the end user with input device 122, generating input data which may be passed from client device 102 to server 104 through network 106.

The systems described above provide a number of functional improvements to computer systems as well as advantages over the prior art. A user may utilize such functionally improved computer systems to participate in micro-raffles for sport or entertainment. Fast paced, instantly drawing and small sized raffles will provide a functional improvement to conventional computer systems and may provide an end user with a much more engaging style of play versus traditional paper based raffles.

The functionally improved electronic micro-raffle may be generated, bet on, and executed within seconds in the systems described above. A fast drawing raffle may provide for a significantly more engaging user experience. A more engaged user may be more likely to continue participating in subsequent raffles, which may generate greater revenue therefore profit for an administrator of such a system.

The engaging aspects are enabled by the networked communication system. In contrast to traditional paper raffles, electronic micro raffles may reach a significantly larger possible player pool. By enabling client devices to communicate with a central server to access raffle games, players may be in any geographical location wherein they may access the internet.

Similarly, the electronic administration of the raffle, through the participation of the central server 104, and a plurality of client devices 102, all communicating through a network 106, allows the raffle to be administrated at a pace that is not practically possible with traditional paper-based raffles. A user may place 50 1$ bets on games each with a game size of 4. If the system is operating such that a sufficient number of users are actively betting and participating in raffles, or by the participation of house betting module, the 50 games that the user placed bets on may fill and execute within a relatively short amount of time. For example, all 50 games may fill with user bets within 10 seconds. Once all bets are filled, all games may be executed within a few seconds, and raffle winners may be identified, notified, and assigned credit in a similar timeframe. Such near instantaneous feedback to an end user may provide a high level of excitement and engagement, increasing the likelihood that a user may continue to participate in raffles, and place further bets. For example, 50 near instantly executing 1$ raffle entries may provide significantly more excitement to a user than a single 50$ raffle entry that executes one day later. This may be advantageous to a raffle system administrator, as a more engaged user base may result in greater revenue.

In a traditional paper based raffle, a user may enter 50 individual raffles, however, individually drawing a winner from each raffle may require a significant amount of time. For example, a single human administrator may have to manually draw 50 raffle winners. This may take 5-10 minutes at minimum. Additional time may be required to identify, notify and transfer value to each raffle winner. Between the time at which a user enters a raffle, and is provided with the value associated with each victory, a large amount of time may have elapsed. The longer the waiting period, the more likely it is that a user may become distracted, or otherwise unengaged with the game, reducing the likelihood that a user continues to place bets on further games.

In addition to time limitations, small sized raffles may be uneconomical to operate using traditional methods if the house cut of each raffle is small and the number of total entries to each raffle is also small. Many human administrators may be retained to draw all raffle entries within a reasonable time frame, resulting in high overhead fees, and therefore, lower payouts to winning end users.

Machine learning based methods described herein may improve the functioning of the electronic raffle computer system, through the application of advanced machine learning techniques. Machine learning based methods described herein or otherwise may be applied to the house betting module, promotion module, or any other module or operation described herein which may benefit from methods to optimize user engagement, system resource usage, raffle administrator revenue or profit.

Figure 12:
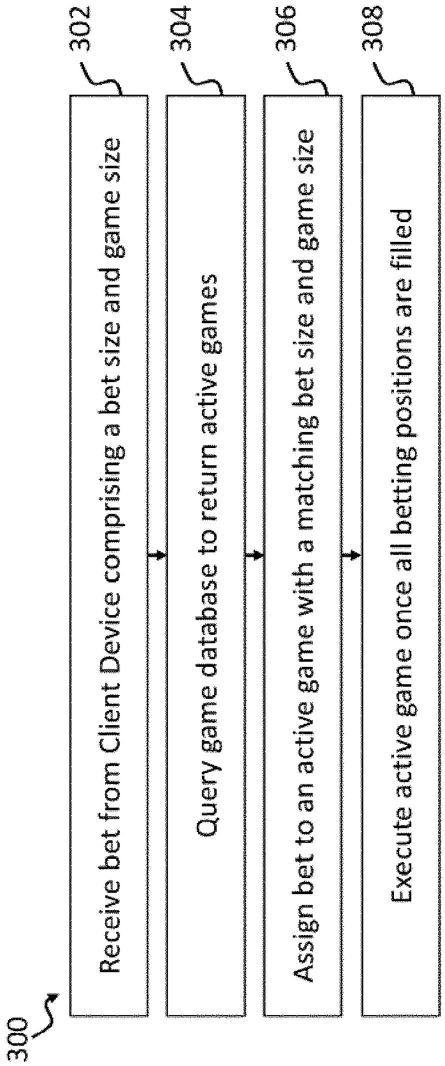
FIG. 12 is a flow chart, depicting a method of operating an electronic instant raffle system, according to an embodiment.

Referring now to FIG. 12, pictured therein is a flowchart describing a method 300 of conducting an electronic instant raffle. Method 300 comprises steps 302, 304, 306, and 308. Description above in reference to system 100, interface 200 and FIGS. 1-11 may apply to method 300.

At step 302, a bet input comprising a bet size and game size is received by the first server from a client device. The bet may be received from an end user, physically interacting with input device 122, to input bet data into the client device.

At step 304, a game database is queried to return active games.

At step 306, the bet is assigned to an active game with a matching bet size and game size.

At step 308, games are executed once all betting positions are filled.

In some examples of method 300, house betting module may place bets on all open betting positions after the bet input is received from the client device at step 302 and assigned at step 306. Once house betting module placed such bets across the open betting positions, step 308 may be conducted and games may be executed.

In some examples of method 300, the method may additionally comprise updating account balance of user accounts of all users who have placed bets on games execute at step 308. Account balances may correspond to hard currency values, that may be converted to cash upon a user withdrawing an account balance.

In some examples of method 300, the method may additionally comprise updating the user interface displayed on the client display device to confirm steps 306 and/or 308.

Figure 13:
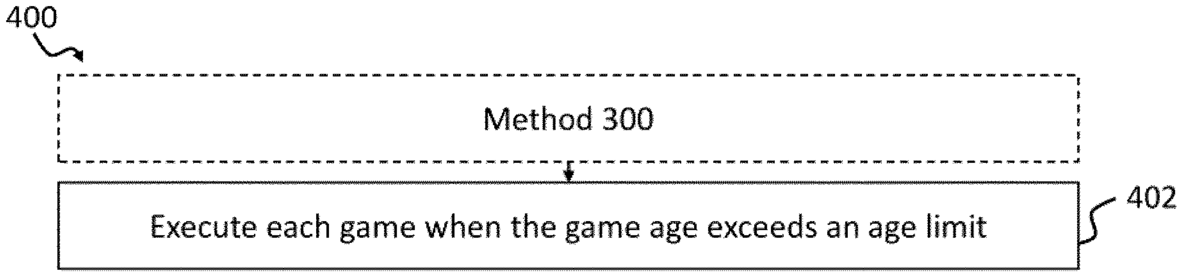
FIG. 13 is a flow chart, depicting a method of operating an electronic instant raffle system, according to an embodiment.

Referring now to FIG. 13, pictured therein is a flowchart describing a method 400 of conducting an electronic instant raffle. Method 400 comprises any or all steps of method 300, as well as step 402. Description above in reference to system 100, interface 200 and FIGS. 1-12 may apply to method 400.

At step 402, each game with a game age exceeding an age limit is executed.

Figure 14:
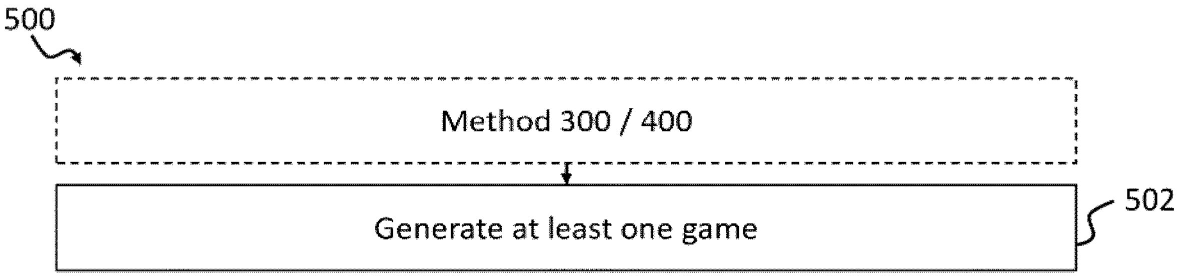
FIG. 14 is a flow chart, depicting a method of operating an electronic instant raffle system, according to an embodiment.

Referring now to FIG. 14, pictured therein is a flowchart describing a method 500 of conducting an electronic instant raffle. Method 500 comprises any or all steps of method 300 and or method 400, as well as step 502. Description above in reference to system 100, interface 200 and FIGS. 1-13 may apply to method 500.

At step 502, at least one game is generated.

In some examples, the systems and methods described herein may be applied to other types of electronic, networked games and or lotteries, other than electronic instant raffles.

For example, the system described herein may be applied to an electronic, networked roulette game. An end user may engage with the system to place bets on an online electronic roulette game. Additionally, an end user may engage with the system to place a bulk bet on an online electronic roulette game. An end user may specify bet size (e.g. $5), bet position (e.g. red, black, 7, etc.), and number of games (e.g. 15). The system may locate games with matching parameters, and may generate new games using a game generation module when an insufficient number of matching existing games are located.

Similarly, the system described herein may be applied to an electronic, networked virtual horse racing game. An end user may engage with the system to place bets on the virtual horse racing game. Additionally, an end user may engage with the system to place a bulk bet on the virtual horse racing game. An end user may specify bet size (e.g. $5), bet position (e.g. horse 1), and number of games or races (e.g. 2). The system may locate games with matching parameters, and may generate new games using a game generation module when an insufficient number of matching existing games are located. Such a virtual horse racing game may allow the user to place bets on horses, which correspond to betting positions. As described above, the systems and methods described herein may determine a drawing order or finishing order associated with each betting position (i.e. horse). In such examples, in a virtual horse racing game variant, a user may place bets based on finishing position. For example, the user may bet on betting position 3 to finish second and betting position 6 to finish third, or any other combination. In such combined bets, payouts and/or winnings may be adjusted to correspond to the decreased odds of winning for such an example.

As described previously in reference to instant electronic raffle applications, bulk betting capabilities may increase pace and play, and therefore, excitement for an end user. Similarly, bulk betting features may reduce the computing resources required by a client device for placing a given number of total bets. This reduction of computing resource requirements increases system efficiency and may improve battery life of a mobile client device, improving the computer system as a whole.

House betting modules may be incorporated into such systems. The application of the house betting module may clear relatively inactive games from active use, reducing processing and memory requirements, as expired games may be archived in long term storage, instead of rapidly accessible memory locations, improving performance of the system. House betting module may additionally reduce operation costs of the system, especially in examples wherein the server comprises a cloud server instance, as described above.

While the above description provides examples of one or more apparatus, methods, or systems, it will be appreciated that other apparatus, methods, or systems may be within the scope of the claims as interpreted by one of skill in the art.

The invention claimed is:

1. An electronic instant raffle system, the system comprising:

a first server, comprising a processor and memory;

a server side module, configured to run on the first server, the server side module comprising:

a game database comprising games, wherein each game comprises a game size, bet size, and an amount of betting positions, equal to the value of the game size; and a game execution module;

a game generation module;

a client device, comprising a display device and an input device for receiving an input from a user, wherein the client device is configured to communicate with the server side module and output a game interface to the display device;

wherein the server side module is configured to:

receive a bet comprising a game size and bet size from the client device input device;

query the game database to locate games with game sizes and bet sizes matching the game size and bet size of the bet;

assign the bet to an open betting position within a located game;

instruct the client device to update the game interface to indicate a bet confirmation to the user;

wherein the game execution module is configured to be queried once all betting positions of a game are filled, and execute the game;

wherein executing the game comprises drawing random numbers within a range of values, until the value associated with a first betting position is drawn, and assigning the first betting position to which the associated value has been drawn as the winning position wherein when no existing games with game sizes and bet sizes matching the game size and bet size of the bet is located, the server side module is configured to input the game size and bet size of the bet to the game generation module, and the game generation module is configured to output a new game with the game size and bet size of the bet to the game database.

2. The system of claim 1, wherein each game further comprises a plurality of betting sub positions associated with each betting position and executing the game comprises drawing random numbers within a range of betting sub positions until all sub positions associated with a first betting position are drawn, and assigning the first betting position to which all sub position values have been drawn as the winning position.

3. The system of claim 2, wherein executing the game further comprises drawing random numbers within the range of betting sub positions until a predetermined number of betting positions have had all sub positions drawn.

4. An electronic game system, the system comprising:

a first server, comprising a processor and memory;

a server side module, configured to run on the first server, the server side module comprising:

a game database comprising games, wherein each game comprises a game size, bet size, and an amount of betting positions, equal to the value of the game size; and a game execution module;

a game generation module;

a client device, comprising a display device and an input device for receiving an input from a user, wherein the client device is configured to communicate with the server side module and output a game interface to the display device;

wherein the server side module is configured to:

receive a bet comprising a game size and bet size from the client device input device;

query the game database to locate games with game sizes and bet sizes matching the game size and bet size of the bet;

assign the bet to an open betting position within a located game;

instruct the client device to update the game interface to indicate a bet confirmation to the user;

wherein the game execution module is configured to be queried once all betting positions of a game are filled, and execute the game;

wherein executing the game comprises drawing random numbers within a range of values, until the value associated with a first betting position is drawn, and assigning the first betting position to which the associated value has been drawn as the winning position;

wherein when no existing games with game sizes and bet sizes matching the game size and bet size of the bet is located, the server side module is configured to input the game size and bet size of the bet to the game generation module, and the game generation module is configured to output a new game with the game size and bet size of the bet to the game database.

5. The system of claim 4, wherein each game further comprises a plurality of betting sub positions associated with each betting position and executing the game comprises drawing random numbers within a range of betting sub positions until all sub positions associated with a first betting position are drawn, and assigning the first betting position to which all sub position values have been drawn as the winning position.

6. The system of claim 1, wherein the server-side module further comprises a house betting module, wherein the house betting module is configured to place bets on any open betting positions of the game.

7. The system of claim 5, wherein each betting position comprises five betting sub position slots, the first slot comprising a value range between 1 and 15, the second slot comprising a value range between 16 and 30, the third slot comprising a value range between 31 and 45, the fourth slot comprising a value range between 46 and 60, and the fifth slot comprising a value range between 61 and 75.

8. The system of claim 4, wherein the server-side module further comprises a house betting module, wherein the house betting module is configured to place bets on any open betting positions of the game.

9. The system of claim 8, wherein the house betting module is configured to place bets on all open betting positions.

10. The system of claim 1, wherein the bet size comprises a monetary value.

11. The system of claim 4, wherein the bet size comprises a monetary value.

12. The system of claim 3, wherein each betting position comprises five betting sub position slots, the five sub position slots comprising value ranges associated with the value ranges of each letter range of a bingo game.

13. The system of claim 1, the server side module further comprising:

a bulk betting module, the bulk betting module configured to receive a bulk bet from the user, the bulk bet comprising a number of bets, a bet size and a game size;

wherein the server side module is configured to:

receive a bulk bet from the client device input device;

query the game database to locate all existing games with game sizes and bet sizes matching the game size and bet size of the bulk bet;

query the game generation module to generate all required additional games;

assign each bet to an open betting position within each located game; and instruct the client device to update the game interface to indicate a bulk bet confirmation to the user.

14. The system of claim 1, wherein each game further comprises a plurality of betting sub positions associated with each betting position and executing the game comprises drawing random numbers within a range of betting sub positions until all sub positions associated with a first betting position are drawn, and assigning the first betting position to which all sub position values have been drawn as the winning position.

15. The system of claim 14, wherein executing the game further comprises drawing random numbers within the range of betting sub positions until a predetermined number of betting positions have had all sub positions drawn.

16. The system of claim 14, wherein each betting position comprises five betting sub position slots, the first slot comprising a value range between 1 and 15, the second slot comprising a value range between 16 and 30, the third slot comprising a value range between 31 and 45, the fourth slot comprising a value range between 46 and 60, and the fifth slot comprising a value range between 61 and 75.

17. The system of claim 14, wherein each betting position comprises five betting sub position slots, the five sub position slots comprising value ranges associated with the value ranges of each letter range of a bingo game.

18. The system of claim 4, the server side module further comprising:

a bulk betting module, the bulk betting module configured to receive a bulk bet from the user, the bulk bet comprising a number of bets, a bet size and a game size;

wherein the server side module is configured to:

receive a bulk bet from the client device input device;

query the game database to locate all existing games with game sizes and bet sizes matching the game size and bet size of the bulk bet;

query the game generation module to generate all required additional games;

assign each bet to an open betting position within each located game; and instruct the client device to update the game interface to indicate a bulk bet confirmation to the user.

19. The system of claim 6, wherein the house betting module is configured to place bets on all open betting positions.

20. The system of claim 19, wherein the game comprises a roulette type game.

* * * * *